United States Patent [19]
Johnson

[11] Patent Number: 5,244,310
[45] Date of Patent: Sep. 14, 1993

[54] IN-SITU SOIL HEATING PRESS/VAPOR EXTRACTION SYSTEM

[75] Inventor: Paul C. Johnson, Sugar Land, Tex.
[73] Assignee: Shell Oil Company, Houston, Tex.
[21] Appl. No.: 770,848
[22] Filed: Oct. 4, 1991
[51] Int. Cl.⁵ ............................................. B09B 3/00
[52] U.S. Cl. .................................... 405/128; 405/131
[58] Field of Search ............. 405/128, 129, 131, 258; 165/45; 392/301; 166/302, 370; 210/747; 588/252, 253

[56] References Cited

U.S. PATENT DOCUMENTS

| | | | |
|---|---|---|---|
| 4,376,598 | 3/1983 | Brouns et al. | 405/129 X |
| 4,435,292 | 3/1984 | Kirk et al. | 210/749 X |
| 4,670,634 | 6/1987 | Bridges et al. | 405/131 X |
| 4,834,194 | 5/1989 | Manchak | 405/131 X |
| 4,842,448 | 6/1989 | Koerner et al. | 405/131 X |
| 4,844,839 | 7/1989 | Manchak | 405/131 X |
| 4,957,393 | 9/1990 | Buelt et al. | 405/258 X |
| 4,973,811 | 11/1990 | Bass | 405/131 X |
| 4,984,594 | 1/1991 | Vinegar et al. | |
| 5,004,373 | 4/1991 | Carter | 405/128 X |
| 5,011,329 | 4/1991 | Nelson et al. | 405/131 X |
| 5,024,556 | 6/1991 | Timmerman | 405/129 X |
| 5,076,727 | 12/1991 | Johnson et al. | 405/128 |
| 5,100,259 | 3/1992 | Buelt et al. | 405/131 X |

FOREIGN PATENT DOCUMENTS 1247907 9/1971 United Kingdom .............. 405/131

Primary Examiner—David H. Corbin
Assistant Examiner—Arlen L. Olsen

[57] ABSTRACT

An in-situ soil heating/treatment system consists of a frame to which are attached a plurality of heater spikes and a plurality of tubular, perforated vapor extraction spikes. An insulated shield covers the frame and internal components. The spikes, which are 1-2 feet in length, are driven into the ground and heated to temperatures in excess of 1000° C. The heat generated at the heater spikes is conducted and convected into the soil. As the soil temperature rises and approaches the boiling point of the contaminants, the contaminants volatilize and flow to the vapor collection spikes. A vacuum system connected to the vapor extraction spikes withdraws the contaminant vapors through the perforated, tubular spikes and treats them.

9 Claims, 2 Drawing Sheets

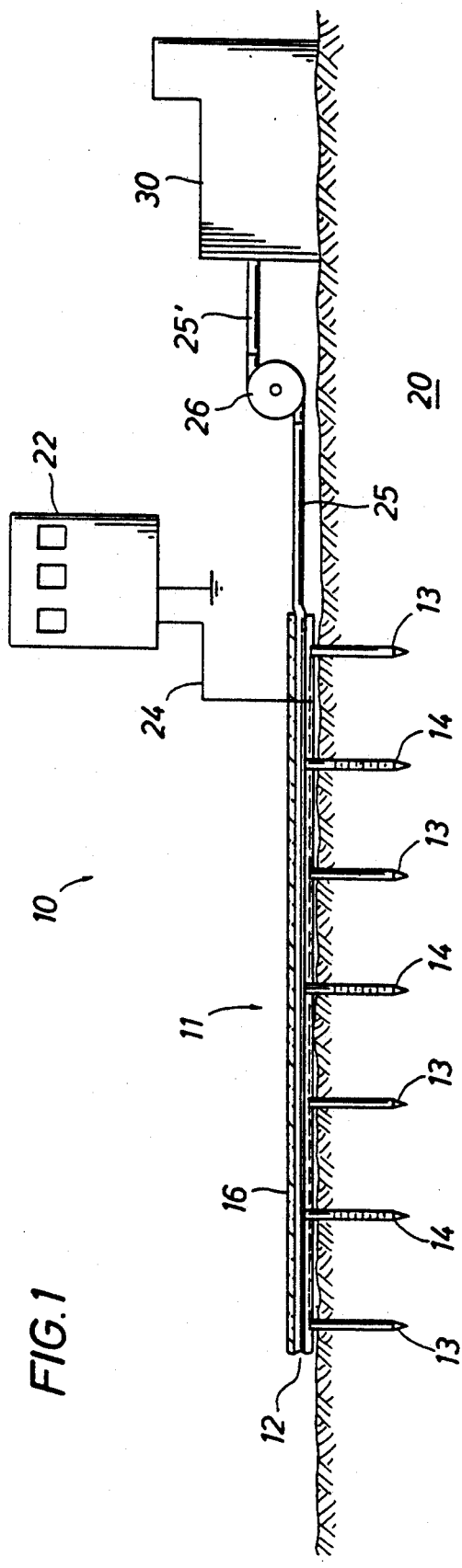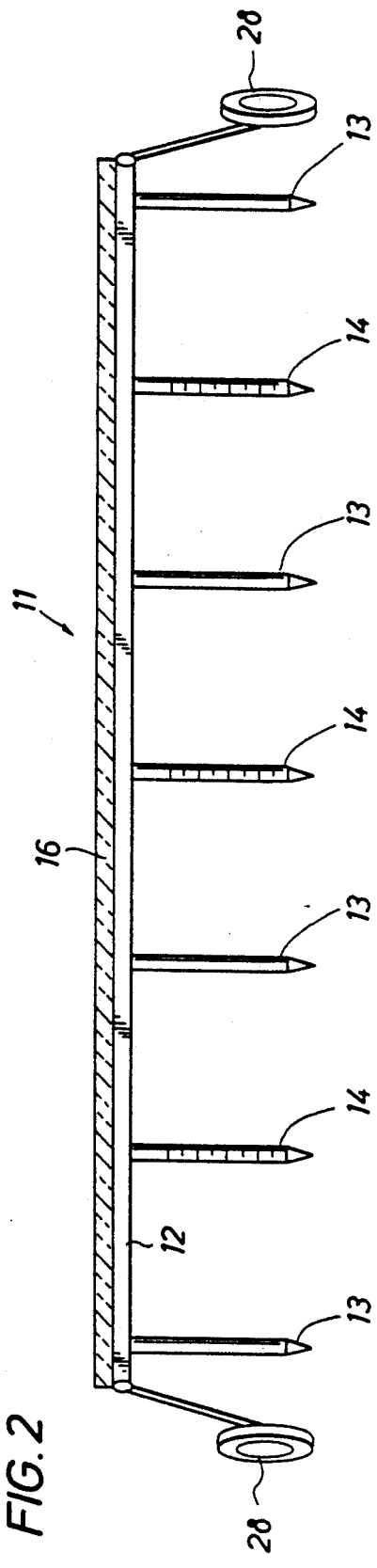

IN-SITU SOIL HEATING PRESS/VAPOR EXTRACTION SYSTEM

Field of the Invention

This invention relates to an improved in-situ method and apparatus for the remediation of soil containing organic or semi-volatile inorganic contaminants. More particularly, the invention relates to the decontamination of soil containing environmentally undesirable organic and inorganic contaminants. This invention is especially useful for the remediation of soils contaminated with non-volatile and semi-volatile organics, such as diesel fuel, aviation and jet fuel, crude oil, polychlorinated benzenes (PCB's) and pesticides and semi-volatile inorganics such as metallic mercury. Such problems may be present at refineries, fuel marketing locations, or chemical plants.

Background of the Invention

A variety of methods have been proposed for the remediation of soil containing organic contaminants. Many of the proposed methods involve removal and subsequent incineration of soil with the attendant difficulties of treatment and/or disposal of off-gases and ash. A major detriment to such processes, however, is the cost of evacuating and transporting the soil.

To avoid at least a portion of these costs, several types of in-situ processes have been proposed including vitrification of the soil by electrode heating, steam or hot air heating of the soil through an auger system or through stationary pipes, and radio-frequency or electrical heating of the soil by means of a surface heater.

Brouns et al, U.S. Pat. No. 4,376,598, disclose a vitrification process in which the soil is heated to approximately 1500° C. At or about this temperature the soil forms a glass-like mass which traps the contaminants therein. This process, in reality, is a stabilization process rather than a decontamination process since the soil undergoing treatment has lost its physical and chemical identity. Both an auger system for injecting steam or hot air and a process for steam injection through stationary pipes have been practiced commercially. These methods have a limited use, primarily in the decontamination of soil containing small areas of deep contamination such as localized spills or leakages at service stations. These methods are not as useful when applied to large areas of contaminated soil.

Bridges et al, U.S. Pat. No. 4,670,634, disclose an in-situ thermal process where the thermal energy is supplied by radio-frequency heating. A somewhat related process is disclosed by Assignee's U.S. Pat. No. 4,984,594 wherein the thermal energy is supplied by a relatively flat heater deployed at the surface of the soil. In this latter process, a lowered pressure is applied at the surface of the soil to remove vapors generated within the soil. This method is somewhat inefficient since significant vapor flow takes place only at the surface of the soil or within a "blanket" placed on the surface of the soil which blanket is more permeable to vapor flow than the soil it covers.

U.S. Pat. No. 4,842,448 issued to Robert M. Koerner et al on Jun. 27, 1989 discloses a method and apparatus for in-situ removal of contaminants from soil comprising a barrier having a permeable inner layer and an impermeable outer layer overlying the contaminated soil and a vacuum system for reducing pressure under the barrier and withdrawing contaminants from the contaminated soil.

In assignee's co-pending application Ser. No. 833,569 filed Feb. 7, 1992 which is a continuation of Ser. No. 427,427 filed Oct. 27, 1989, now abandoned, an in-situ method is disclosed for remediation and decontamination of surface and near-surface soils by electrically heating the soil through electrodes operated at power line frequencies of about 60 Hz. The electrodes are implanted substantially vertically in the soil in a line pattern which allows substantially uniform electrical heating in the region between rows of electrodes. The depth of electrode insertion is substantially equal to the depth of the contamination, but could be deeper or shallower. The process is particularly applicable to soils contaminated at depths of up to about 30 meters. The electrodes are hollow and perforated below the surface to allow application of a vacuum to the soil through the electrodes. The electrodes are also equipped with provision for electrical connection and vacuum line connection, and also with the capability to be sealed to a barrier that is impermeable to gases, such as a flexible sheet.

U.S. Pat. No. 4,435,292 discloses a portable system which can be installed at an area where a contaminating spill has occurred. After the area of the contamination has been determined, perforated pipes are inserted into the ground. Some of the wells are pressurized and others are evacuated simultaneously so as to increase the transfer of a flushing fluid through the soil thereby accelerating the decontamination process and preventing migration of the contaminant into other areas. Since the system is a closed system, the contaminated liquid taken off in the evacuation side of the circulating system is bypassed in whole or in part to a portable processing plant wherein the contaminants are removed.

In Assignee's co-pending application Ser. No. 559,771 filed Jul. 30, 1990, now U.S. Pat. No. 5,076,727, moist warm air from a vapor treatment system is injected into wells which are screened (perforated) only at the contaminated depth forcing vapor flow only through the contaminated region. Between the injection wells is an extraction well which is also screened only at the contaminated depth. A vacuum is drawn on the extraction well through the contaminated soil, thereby entraining the contaminants. The contaminated, flushing vapor is then treated and recycled. A microwave/radio frequency (MW/RF) heating system heats the earth's surface and the contaminated soil, thereby enhancing volatilization of the contaminants and their removal via the vapor flushing system. By screening the wells only through the contaminated zone and maintaining the contaminated soil zone in a moist state, the entire energy of the system is focussed on the contaminated region.

In Assignee's copending application Ser. No. 627,479, filed Dec. 14, 1990, now U.S. Pat. No. 5,190,405, an in-situ method for removal of contaminants from soil imposes a vacuum on the soil through perforated heater wells that are positioned in the soil. The heater wells heat the soil to elevated temperatures by thermal conduction. The heater wells are permeable to vapors which emanate from the soil when heated and which are drawn toward the heater wells by the imposed vacuum. An impermeable flexible sheeting on the soil surface reduces the amount of air that is being pulled into the heater well from the atmosphere. A thermal insulator covers the soil surface and reduces heat losses from the soil surface. The heater wells are connected to a vacuum manifold for collection of vapors. A heat front moves away from the heater wells through the soil by thermal conduction, and the superposition of heat from a plurality of heater wells results in a more uniform temperature rise throughout the well pattern. Soil contaminants are removed by vaporization, in-situ thermal decomposition, oxidation, combustion, and by steam distillation. The heater wells and the nearby soil are extremely hot and many contaminants drawn into the wells will decompose with a residence time on the order of seconds. The heater well can also be packed with a catalyst that accelerates high temperature decomposition into simpler molecules. Water vapor and remaining contaminants may be incinerated in line or may be collected in a cold trap upstream from the vacuum pump.

In Assignee's co-pending application Ser. No. 705,712, filed May 23, 1991, now U.S. Pat. No. 5,193,934, an in-situ thermal desorption system utilizes perforated or slotted pipe buried essentially horizontally in the soil below the depth of contamination in the soil. The surface of the soil is covered with a layer of permeable insulation (to conserve heat and to provide a gas migration path on top of the soil) and a layer of impermeable material above the insulation. A vapor recovery/treatment system located at the surface consists of a means of inducing a vacuum between the impermeable layer and the soil surface (e.g., a vacuum pump or an induced draft fan) and a treatment system for the contaminated vapor (e.g., a cold trap, carbon adsorption, or incineration). Fuel and compressed air are fed to a pressurized combustion chamber and combusted, the combustion products flow into the buried pipe and are distributed through the contaminated soil. Heat from the pressurized combustion products causes the organic contaminants within the soil to vaporize, pyrolyze, decompose, or react with oxygen. Contaminants and their by-products are swept away by the combustion products into the vapor recovery/treatment system.

In Assignee's co-pending application Ser. No. 705,708, filed May 23, 1991, now U.S. Pat. No. 5,169,263, An improved in-situ soil heating process utilizes a submerged vapor recovery system comprising perforated or slotted pipes buried in the soil below the depth of contamination. The pipes may be buried in a manifold arrangement and may contain thermocouples to monitor temperature. A vapor recovery/treatment system is connected to the buried pipe network and includes a method of inducing a vacuum on the buried pipe network (e.g., a vacuum pump or an induced draft fan) and a treatment system for the contaminated vapor (e.g., a cold trap, carbon adsorption, or incineration). Heat is applied to the soil surface by a relatively flat, surface-conforming, resistance heater. Heat causes the organic contaminants within the soil to vaporize, pyrolyze, decompose, or react with oxygen. The contaminants and their by-products are swept away by the air into the buried pipe network for further treatment or disposal.

SUMMARY OF THE INVENTION

An in-situ soil heating/treatment system consists of a frame to which are attached a plurality of heater and vapor collection/extraction "spikes." An insulated shield covers the frame and internal components. The heater spikes, which are 1-2 feet in length, are driven into the ground and then heated to temperatures in excess of 1000° C. The heat generated at the heater "spikes" is conducted and convected into the soil. As the soil temperature rises and approaches the boiling point of the contaminants, the contaminants volatilize and flow to the vapor collection spikes which are tubes maintained at negative pressure. A vacuum system connected to the vapor extraction spikes withdraws the contaminant vapors and treats them. The vapor collection spikes may also be heated.

BRIEF DESCRIPTION OF THE DRAWINGS

FIG. 1 is a schematic view of the system.
FIG. 2 is a sectional side view of the heating press.

DETAILED DESCRIPTION OF THE INVENTION

Figure 3:
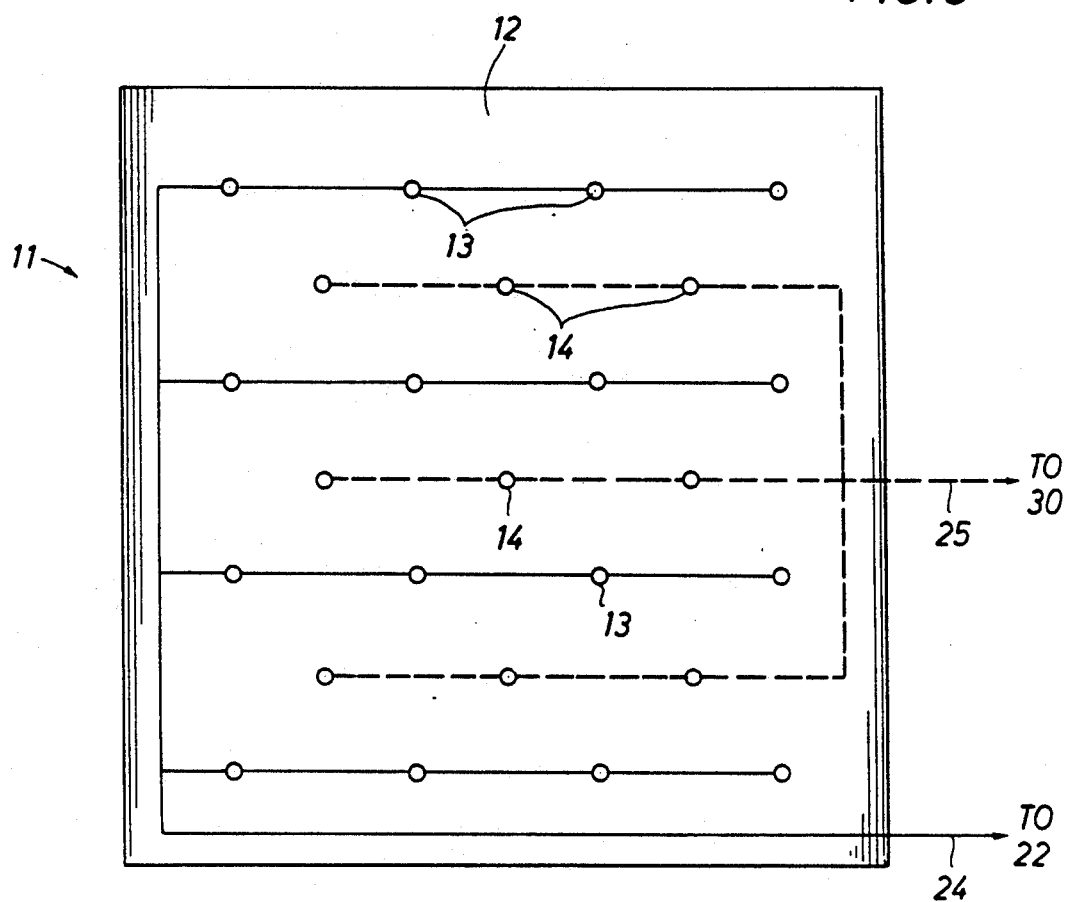
FIG. 3 is a plan view of the heating press layout.

This invention is directed to a method and apparatus for the remediation of contaminated surficial soils (0-4 ft below ground surface). The heat generated at the heater "spikes" is conducted and convected into the soil. As the soil temperature rises and approaches the boiling point of the contaminants, the contaminants volatilize and flow to the vapor collection spikes which are perforated tubes maintained at reduced pressure. The heater spikes can be energized and heated to temperatures in excess of 1000° C., and hence this device is especially suited for the treatment of non-volatile contaminants, such as pesticides, polychlorinated benzenes (PCB's), diesel fuels, jet fuels, crude oil and semi-volatile metals. The heater/vapor extraction spike spacing is adjustable so that a variety of soil types can be treated. The spike density (number of heaters/area) would be greater in clayey (less permeable) soils than in sandy soils.

FIG. 1 is a generalized diagram of the salient features of the invention, an in-situ soil heating and vapor treatment system generally designated as 10. The heating press 11 comprises a rigid structural frame 12 supporting a plurality of heater 13 and vapor collection/extraction 14 "spikes." An insulated shield 16 covers the frame 12 and its internal components. The spikes 13, 14 are approximately 1-2 feet in length and are driven into the contaminated ground 20. Heater spikes 13 are heated by electrical power supplied from the power supply 22 by conductors 24 as shown more clearly in FIG. 3. The vapor extraction spikes 14 are connected to a manifold (not shown) and to a vacuum pump 26 by conduit 25. In an alternative embodiment, the vapor extraction spikes may also be heated by the power supply 22. As the heater spikes 13 (and extraction spikes 14 if desired) are heated to temperatures up to approximately 1000° C., the contaminated earth 20 into which they are inserted is heated by conduction and convection. As the contaminated soil 20 reaches the boiling points of the various contaminants, the contaminants volatilize and flow toward and through perforations in the vapor extraction spikes 14 by virtue of negative pressure created by vacuum pump 26. The contaminant vapors are then treated by vapor treatment system 30 which is connected to vacuum pump 26 by conduit 25'.

Referring now to FIGS. 2 and 3, details of the heater press are shown. Connected to the frame 12 are means for moving the press to a suitable site, such as by collapsible wheels 28. The press is towed to a selected site, then the wheels 28 collapse as the press spikes 13, 14 are driven into the contaminated soil 20.

The spikes 13, 14 may be e.g. approximately 1" in diameter and preferably are made of a corrosion-resistant alloy, such as stainless steel. The heater spikes 13 have electrical heaters attached thereto or, in the alternative, the heater may be an integral part of each spike. The vapor collection/extraction spikes 14 are hollow tubes with perforations along the length to draw and collect contaminated vapors from the soil and direct the vapors to an appropriate vapor treatment system 30. As previously noted, the collection/extraction spikes 14 may, if desired, be electrically heated.

Figure 4:
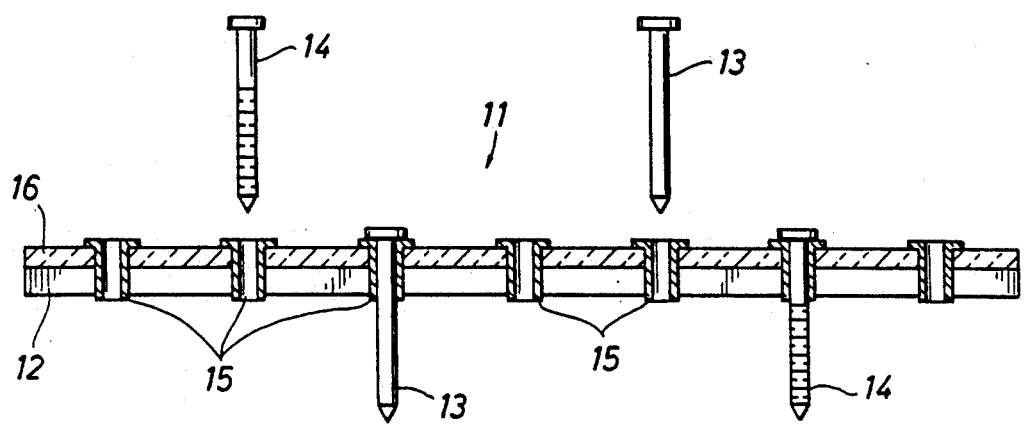
FIG. 4 is a sectional side view of an embodiment utilizing insertable heater and extraction spikes.

The spikes 13, 14 may be an integral part of the frame 12, i.e., they may be welded or otherwise permanently secured to the underside of the frame 12 at selected intervals. Alternatively, as shown in FIG. 4, the frame 12 may have vertical, cylindrical passageways, i.e. tubular guides 15 spaced from each other in a selected pattern through which the spikes 13, 14 may be inserted and driven into the ground such as, e.g. by means of a sledgehammer. The pattern, e.g. may be grid-like. After the spikes 13, 14 are driven into the ground, electrical connections may be made as appropriate.

In configurations wherein the spikes 13, 14 are an integral part of the frame 12, the entire frame must be subjected to a force sufficient to cause the spikes 13, 14 to be driven into the soil. Such a force may be obtained from a portable hydraulic ram, pile driver or other such construction equipment.

The spikes 13, 14 may be spaced according to desired remediation time, soil type and contaminant type. Typical spacings between spikes may be on the order of 1-3 feet.

The vapor treatment system 30 may consist of e.g., a thermal oxidation unit, a catalytic vapor treatment unit, a carbon bed, a condenser, a biological treatment unit, a liquid/vapor extraction unit or combinations of any of the above.

What is claimed is:

1. An apparatus for in-situ remediation of contaminated soil comprising:
   a rigid structural frame adapted to be placed in contact with said contaminated soil;
   a plurality of heater spikes fixedly attached to the underside of said frame said spikes being adapted to be driven into said contaminated soil;
   means for supplying electrical power to said heater spikes;
   a plurality of vapor extraction spikes fixedly attached to the underside of said frame said spikes being adapted to be driven into said contaminated soil;
   means for applying negative pressure to said extraction spikes and withdrawing contaminated vapors therefrom; and
   means for driving said heater and vapor extraction spikes into said contaminated soil.

2. The apparatus of claim 1 further comprising means for moving said apparatus from one site to another.

3. The apparatus of claim 2 wherein said means for moving includes retractable wheels attached to said frame.

4. The apparatus of claim 1 further comprising means for treating said withdrawn contaminated vapors.

5. The apparatus of claim 1 further comprising an insulating layer placed over said frame.

6. The apparatus of claim 1 further comprising means for supplying electrical power to said vapor extraction spikes.

7. An apparatus for in-situ decontamination of soil comprising:
   a rigid structural frame;
   a plurality of heater spikes fixedly attached to the underside of said frame;
   a plurality of vapor extraction spikes fixedly attached to the underside of said frame;
   means for moving said apparatus to a selected location said means for moving comprising wheel means retractably attached to said frame;
   means for driving said spikes into said soil at said selected location;
   means for supplying electrical power to said heater spikes;
   means for applying negative pressure to said vapor extraction spikes and withdrawing contaminated vapors therethrough; and
   means for treating said withdrawn contaminated vapors.

8. The apparatus of claim 7 further comprising an insulating layer placed over said frame.

9. The apparatus of claim 7 further comprising means for supplying electrical power to said vapor extraction spikes.

* * * * *